UNITED STATES PATENT OFFICE.

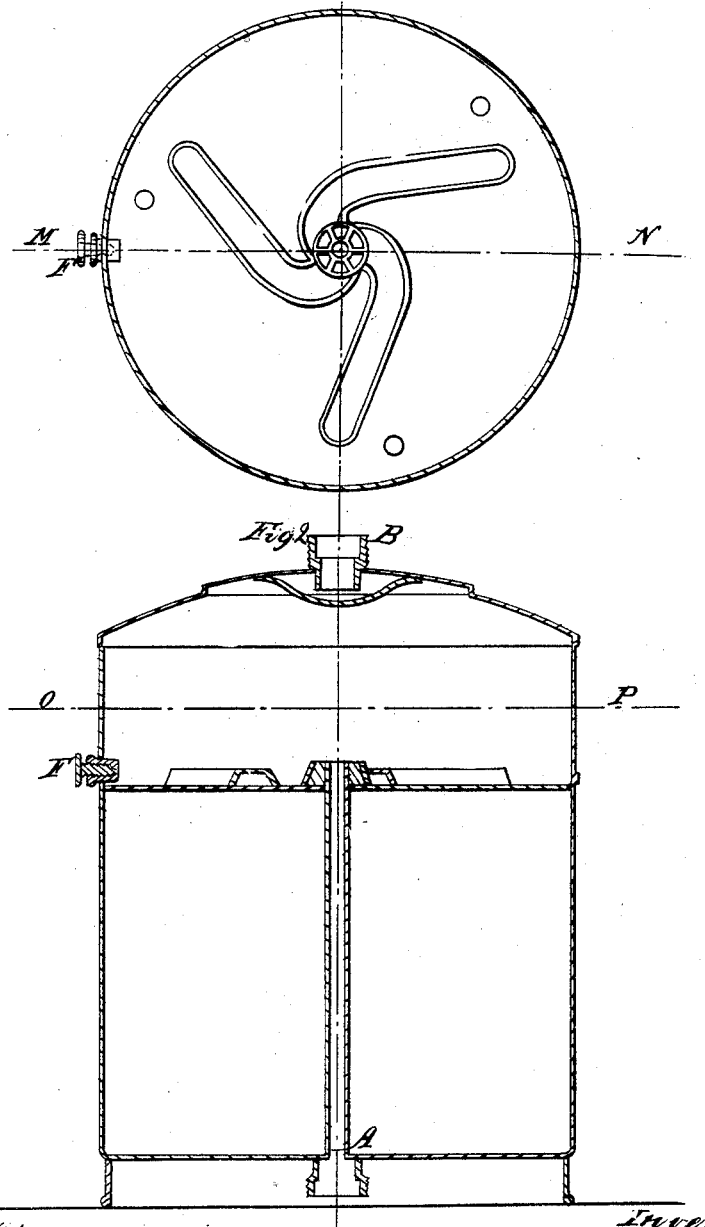

ROBERT H. GRATZ AND CHARLES C. LLOYD, OF PHILADELPHIA, PENNSYLVANIA; SAID LLOYD ASSIGNOR TO SAID ROBERT H. GRATZ.

IMPROVEMENT IN DRY GAS-METERS.

Specification forming part of Letters Patent No. 30,524, dated October 23, 1860.

*To all whom it may concern:*

Be it known that we, ROBERT H. GRATZ and CHARLES C. LLOYD, both of the city of Philadelphia and State of Pennsylvania, have made certain new and useful Improvements in Dry Gas-Meters; and we do hereby declare the following to be a full, clear, and exact description of the same, reference being had to the annexed drawings, in which—

Figure 1 represents a bottom view of the gallery, and Fig. 2 represents a section of the whole meter.

The nature of our invention consists in placing the inlet at the bottom of a dry gas-meter and in placing the outlet at the top of the meter, thus dispensing with side tubes. The advantages of this arrangement are that the gas enters direct from the service-pipe at the bottom. The condensation by its gravity is conducted into the main, from which it is removed in the ordinary manner, and the necessity of drawing it from the meter is dispensed with.

The drawings represent this improvement applied to a rotary gas-meter; but it may be applied with equal advantages to other kinds.

A represents the inlet placed at the bottom of the meter, and B the outlet, placed at the top. When the outlet is placed at the top, a cup is fixed in the inside to catch and retain any liquid condensation from discharging itself upon the valves, and being thus carried to the inside chambers of the meter.

At F is an opening closed by a thumb-screw, by which any liquid deposit in the gallery is drawn off.

Having thus described our improvement, what we claim as our invention, and desire to secure by Letters Patent, is—

Placing the inlet A at the bottom of a dry gas-meter, thereby producing simplicity in the attachment and permitting the liquid condensation to flow direct into the main, substantially as herein set forth.

R. H. GRATZ.
CHAS. C. LLOYD.

Witnesses:
JNO. B. KENNY,
WM. COLBERT.